United States Patent [19]

Emery et al.

[11] Patent Number: 5,380,039

[45] Date of Patent: Jan. 10, 1995

[54] AIR BAG INFLATOR

[75] Inventors: Jerome W. Emery, Gilbert, Ariz.;
Alex G. Meduvsky, Warren, Mich.;
Thomas L. Ruhlman, North Branch,
Mich.; Thomas Osentoski,
Marysville, Mich.

[73] Assignee: TRW Vehicle Safety Systems Inc., Lyndhurst, Ohio

[21] Appl. No.: 129,455

[22] Filed: Sep. 29, 1993

[51] Int. Cl.⁶ ............................................. B60R 21/26
[52] U.S. Cl. .................................. 280/741; 280/742
[58] Field of Search ................. 280/736, 737, 741, 742

[56] References Cited

U.S. PATENT DOCUMENTS

| | | | |
|---|---|---|---|
| 4,200,615 | 4/1980 | Hamilton et al. | 280/741 |
| 4,878,690 | 11/1989 | Cunningham | 280/741 |
| 4,890,860 | 1/1990 | Schneiter | 280/741 |
| 5,033,772 | 7/1991 | Frantom et al. | 280/737 |
| 5,109,772 | 5/1992 | Cunningham et al. | 280/741 |
| 5,255,938 | 10/1993 | Brede et al. | 280/736 |

FOREIGN PATENT DOCUMENTS

0592254  4/1994  European Pat. Off.

*Primary Examiner*—Kenneth R. Rice
*Attorney, Agent, or Firm*—Tarolli, Sundheim & Covell

[57] ABSTRACT

An air bag inflator (10) includes a housing (12) open at one end. Inflator parts including gas generating material (70) are disposed in the housing (12). A retainer assembly (138) in the housing has a first part (170) expanded outwardly into interlocking engagement with a part (30) of the housing wall (14) adjacent the opening (24). This blocks movement of the retainer assembly (138) relative to the housing (12) toward the open end (24) of the housing (12). An end cap (90) is screwed into the open end (24) of the housing (12) after the retainer (140) is positioned in and interlocked with the housing (12). The retainer (140) is disposed intermediate the end cap (90) and the gas generating material (70). Because retainer (140) is disposed between the gas generating material (70) and a body of auto ignition material (122) in the end cap (90), a nozzle (150) is formed in the retainer (140) to direct auto ignition combustion products toward the gas generating material (70).

23 Claims, 8 Drawing Sheets

AIR BAG INFLATOR

BACKGROUND OF THE INVENTION

1. Technical Field

The present invention relates to an apparatus for inflating a vehicle occupant restraint such as an air bag. More particularly, the present invention relates to an air bag inflator having a retainer disposed within a housing for inhibiting movement of gas generating material in the housing.

2. Description of the Prior Art

In a known air bag inflator, a body of solid gas generating material is disposed within a tubular cylindrical housing. An end cap is screwed into an open end of the housing to close the housing. As the end cap is screwed into the housing, it may contact the gas generating material. It is preferable to minimize contact of the end cap with the gas generating material in order to avoid damaging the gas generating material. Also, contact between the end cap and the gas generating material or other inflator parts may apply an axial load to the end cap. This axial load may result in the end cap canting in the open end of the housing and can result in thread galling or stripping.

The known inflator includes a body of auto ignition material having an ignition temperature below the ignition temperature of the gas generating material. When the ambient temperature around the inflator exceeds a predetermined temperature, the auto ignition material ignites. Products of combustion of the auto ignition material ignite the gas generating material.

SUMMARY OF THE INVENTION

The present invention is an apparatus for inflating a vehicle occupant restraint such as an air bag. The apparatus includes a housing defining a chamber having an opening at one end. Inflator parts disposed in the chamber include gas generating material for, when ignited, generating gas for inflating the air bag. A closure member is engageable with the housing for closing the opening of the chamber. The closure member is movable relative to the housing from a first condition, in which the closure member is spaced apart from the housing and the chamber is open, to a second condition, in which the closure member is engaged with the housing and closes the opening of the chamber. A retainer is disposed in the chamber adjacent the opening and blocks contact between the closure member and the other inflator parts disposed in the chamber, including the gas generating material. The retainer has a first part interlocking with a second part on the housing wall when the closure member is in the first condition to block movement of the retainer and of the inflator parts relative to the housing toward the opening of the chamber.

A body of auto ignition material is disposed in the housing. The auto ignition material has an ignition temperature below the ignition temperature of the gas generating material. The retainer is disposed intermediate the body of auto ignition material and the gas generating material. The retainer has a nozzle for establishing fluid communication between the auto ignition material and the gas generating material and for directing products of combustion of the auto ignition material toward the gas generating material.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENT

Figure 1:
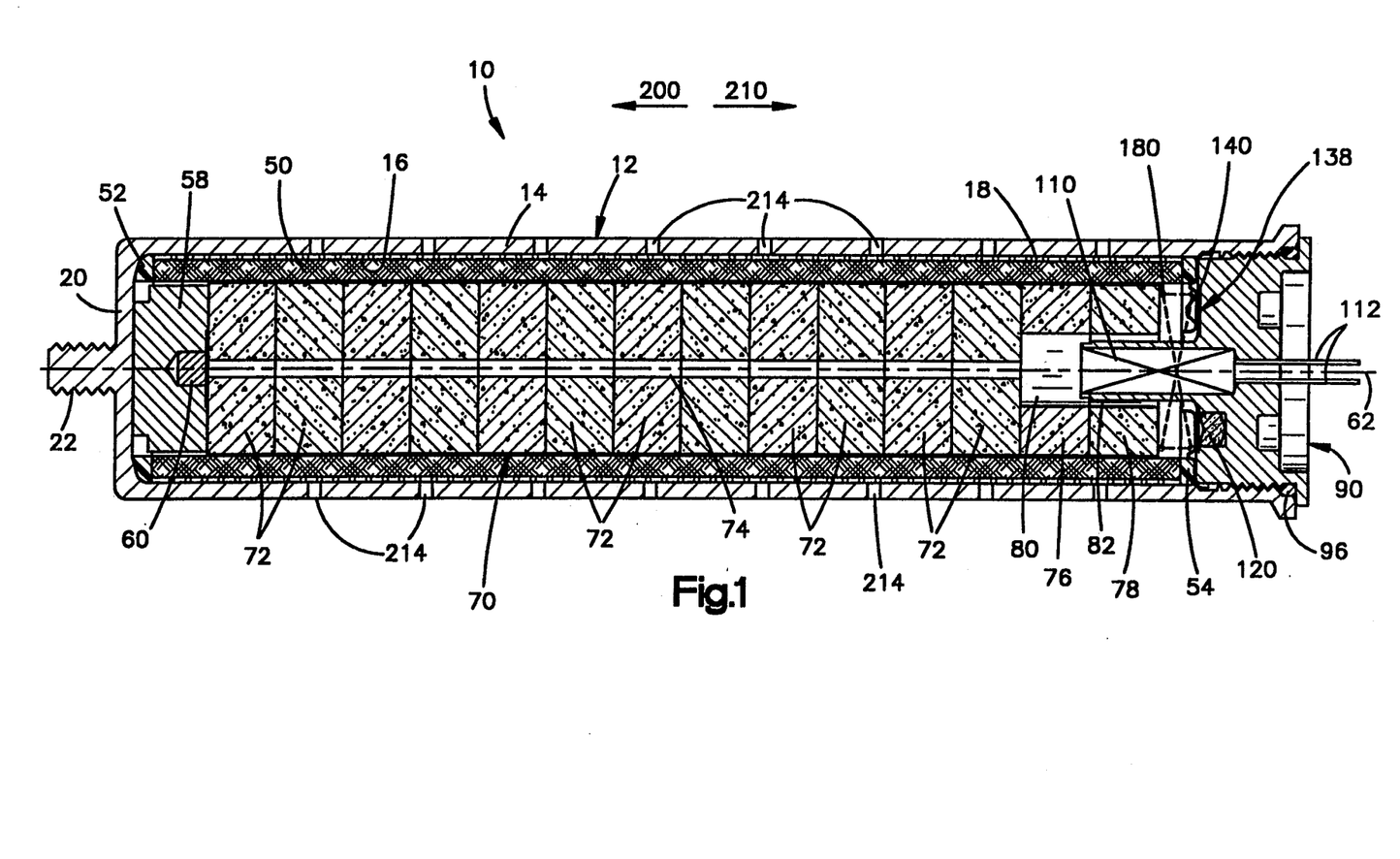
FIG. 1 is a longitudinal sectional view of an air bag inflator in accordance with the present invention in the assembled condition, and having a retainer assembly including a retainer and a spring.

The present invention relates to an air bag inflator and particularly to an inflator for inflating an air bag to protect a passenger of a vehicle. The present invention is applicable to various inflator constructions. As representative of the present invention, FIG. 1 illustrates an inflator 10. The inflator 10 includes a housing 12. The housing 12 includes a tubular cylindrical wall 14 having a cylindrical inner surface 16 defining a chamber 18 in the housing 12.

An end wall 20 of the housing 12 closes one end of the chamber 18. A threaded mounting stud 22 projects axially from the end wall 20 in a direction away from the chamber 18. The chamber 18 has an opening 24 (FIG. 3) at the opposite end of the inflator 10. The housing wall 14 has an inner thread 26 adjacent the opening 24.

The housing 12 includes an annular lip 30 (FIG. 3) projecting radially inward from the wall 14. The lip 30 is disposed axially inward of the thread 26. The lip 30 has an axially extending inner surface 42 which defines a passage 44 into the chamber 18.

The lip 30 has a radially extending axially inward facing surface 32. A cylindrical surface 34 of the housing wall 14 is disposed axially inward of the lip 30 adjacent the surface 32. The housing wall 14 has a conical surface 36 disposed axially inward of the cylindrical surface 34. Together, the surfaces 32, 34 and 36 define between them a circumferential groove 40 in the housing wall 14. The groove 40 is disposed axially inward of the lip 30. The diameter of the groove 40 as defined by the wall 34 is greater than the diameter of the passage 44.

An elongated, annular filter 50 is disposed in the chamber 18 adjacent the inner surface 16 of the wall 14 of the inflator housing 12. An annular inner filter seal 52 (FIG. 1) is disposed between the filter 50 and the housing end wall 20. An annular outer filter seal 54 engages an axially outer end surface 56 (FIG. 3) of the filter 50 adjacent the opening 24 of the chamber 18.

A spacer 58 (FIG. 1) is disposed in the chamber 18 adjacent the end wall 20. The spacer 58 is disposed radially inward of the seal 52 and the filter 50. A body of auto ignition material 60 is located in the spacer 58, on the longitudinal central axis 62 of the inflator 10.

Gas generating material 70 is disposed in the chamber 18 in the housing 12, radially inside the filter 50. The gas generating material 70 includes a plurality of grains of gas generating material arranged in two groups. The grains 72 in a first group have central openings defining a relatively small diameter central passage 74 extending axially through the gas generating material 70. The second group of grains of gas generating material 70 includes two identical grains 76 and 78 with relatively large diameter central openings 80 and 82, respectively. The grain 78, which is the axially outermost grain adjacent the opening 24, has an axially outer end surface 84 (FIG. 3) facing in the direction of the opening of the chamber 18.

An end cap 90 (FIG. 3) closes the opening 24 of the chamber 18 in the housing 12. The end cap 90 has a main body portion 92 and an outer flange 94. An annular seal 96 seals between the end cap flange 94 and an end surface 98 of the housing 12. An outer thread 106 of the end cap 90 engages the inner thread 26 of the housing 12. A thread sealant (not shown) seals between the threads 106 and 26.

The end cap 90 has an axially outer end surface 100 and an axially inner end surface 102. A barrel portion 104 of the end cap 90 projects axially inward from the surface 102. An igniter 110 (FIGS. 2 and 3) is secured in the barrel portion 104 of the end cap 90. The igniter 110 is of a known construction suitable to ignite the gas generating material 70. Lead wires 112 extend outward from the igniter 110 through the end cap 90 and are connected to vehicle electric circuitry in a known manner to receive an actuating signal to actuate the igniter 110 and thereby the inflator 10.

The end cap 90 has an axially extending annular surface 124 (FIG. 10) and a radially extending annular surface 126 which define an annular recess 128 in the inner end surface 102 of the end cap. The recess 128 extends 360° around the end cap barrel portion 104. An axially extending cavity 122 is formed at one point in the recess 128 and receives a body of auto ignition material 120. To seal the auto ignition material 120 in the cavity 122, an annular ring of metal foil tape 130 is disposed in the recess 128. The foil tape 130 adheres to the radially extending annular surface 126 as shown in solid lines in FIG. 10. The foil tape 130 is thinner in axial dimension than the axial depth of the recess 128.

The inflator 10 includes a retainer assembly 138 disposed in the chamber 18 in the housing 12. The retainer assembly 138 is disposed intermediate the inflator end cap 90 and the gas generating material 70. The retainer assembly 138 includes a disc-shaped metal retainer 140 (FIGS. 8 and 9), which is preferably made of stainless steel. The retainer 140 is circular and generally planar and extends around the inflator axis 62. The retainer 140 has an axially outward facing surface 144 and an axially inward facing surface 146.

Figures 8, 9:
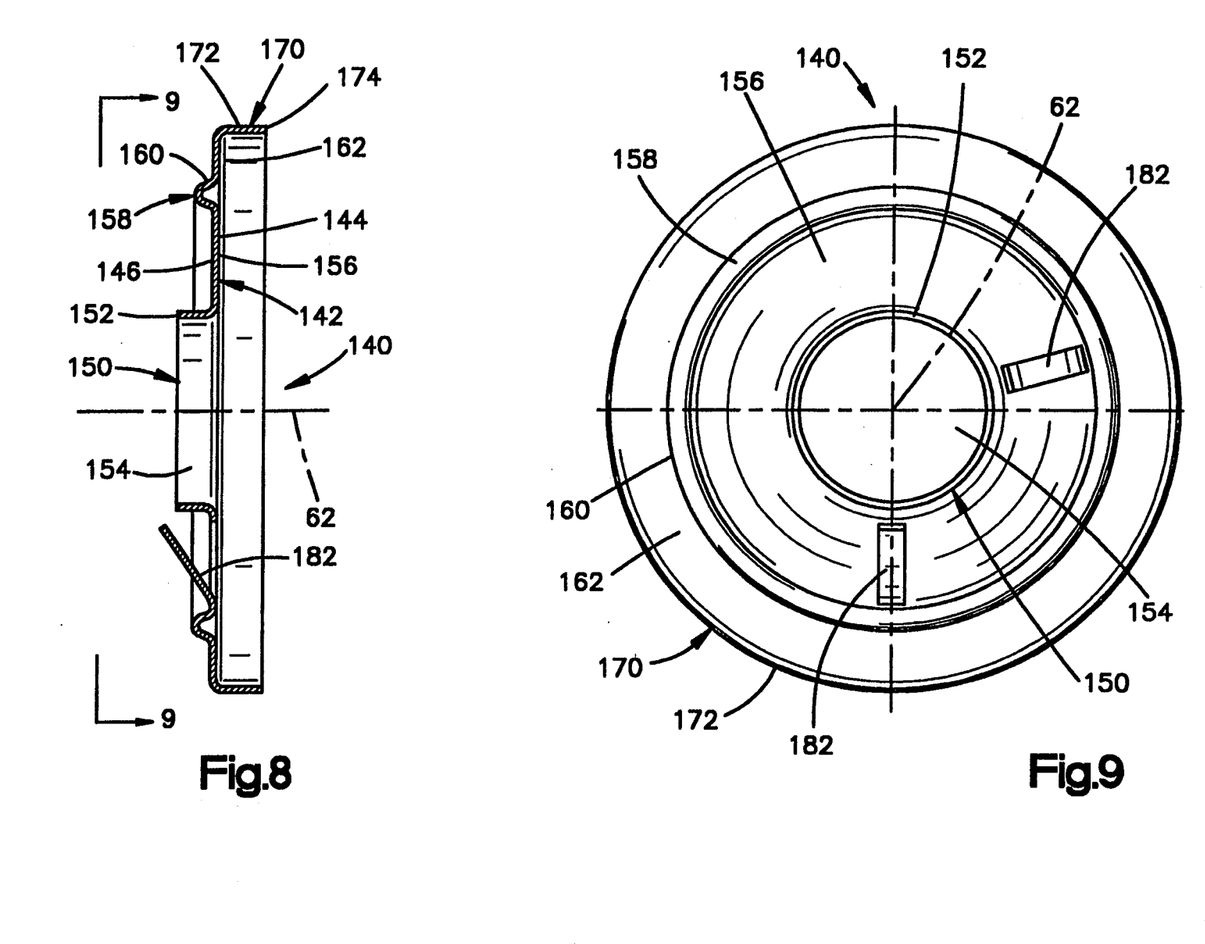
FIG. 8 is a transverse sectional view of the retainer of the inflator of FIG. 1.
FIG. 9 is a view taken along line 9—9 of FIG. 8.

The retainer 140 includes a centrally located nozzle 150. The nozzle 150 includes an annular nozzle wall 152 concentric with the axis 62 and defining a central opening 154 in the retainer. The nozzle wall 152 extends axially in a direction away from the opening 24 of the chamber 18.

A generally flat portion 156 of the retainer 140 extends radially outward from the nozzle 150. An annular ridge 158 disposed radially outward of the flat portion 156 projects axially from the flat portion 156 in a direction away from the opening 24 in the chamber 18. The ridge 158 has a surface 160 facing generally radially outward from the axis 62.

Another generally flat portion 162 of the retainer 140 extends radially outward from the ridge 158 to a peripheral flange 170 of the retainer 140. The flange 170 projects axially outward from the retainer flat portion 162 in a direction toward the opening 24 in the chamber 18. The flange 170 has an axially extending outer surface 172 and a radially extending axial end surface 174.

The retainer assembly 138 also includes a compression spring 180 (FIG. 3) connected with the retainer 140. Two tabs 182 on the retainer 140 secure the spring 180 to the generally flat portion 162 of the retainer. The spring 180 is preferably a wave spring sold under the brand name SPIRAWAVE® by Smalley Steel Ring Company of Wheeling, Ill. The spring 180 has a series of turns indicated schematically at 184 (FIG. 10) which define between them an open center passage 186 of the spring 180. The spring 180 has an axially inner end portion 188.

The inflator 10 (FIGS. 1 and 3) is assembled by first inserting the spacer 58 and the inner filter seal 52 into the housing 12 in an axially inward direction as indicated by the arrow 200. Next, the filter 50 and the gas generating material 70 are inserted into the housing 12. The outer filter seal 54 (shown spaced outward from the filter 50 and housing 12 in FIG. 3) is then positioned in the housing 12, engaging the axial outer end 56 of the filter 50.

Figure 3:
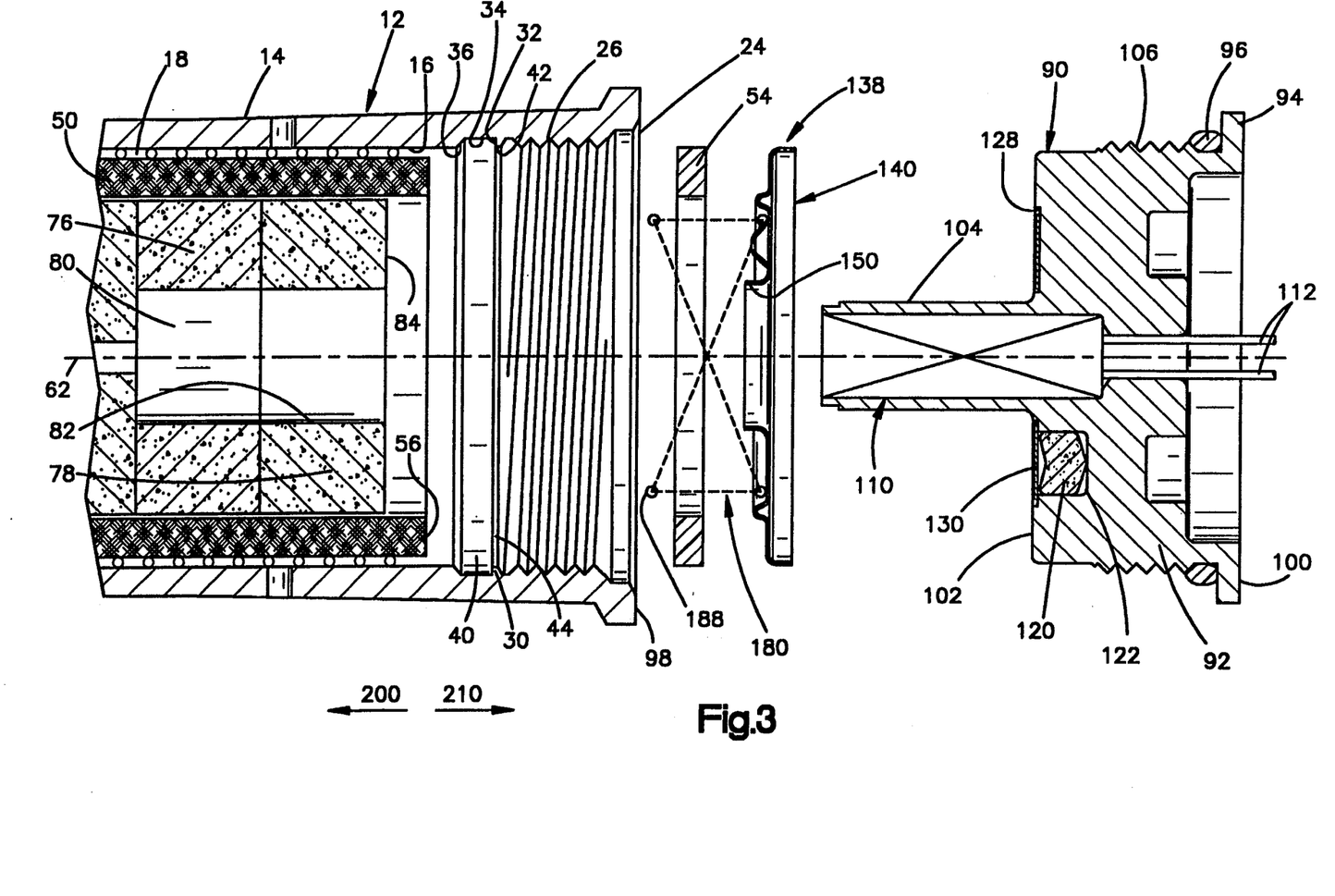
FIG. 3 is an exploded view of parts of the inflator of FIG. 2 shown in a first step of assembly of the inflator.

The retainer assembly 138, including the retainer 140 with the spring 180 attached, is inserted axially through the opening 24 into the chamber 18 in the housing 12. The outer diameter of the retainer 140 is less than the inner diameter of the housing wall lip 30. The retainer assembly thus can move axially through the passage 44 past the lip 30. The axially inner end portion 188 of the spring 180 contacts the axially outer end surface 84 of the outermost grain 78 of gas generating material. At this point, the peripheral flange 170 of the retainer 140 is disposed approximately adjacent the inner thread 26 of the inflator housing 12.

Figure 4:
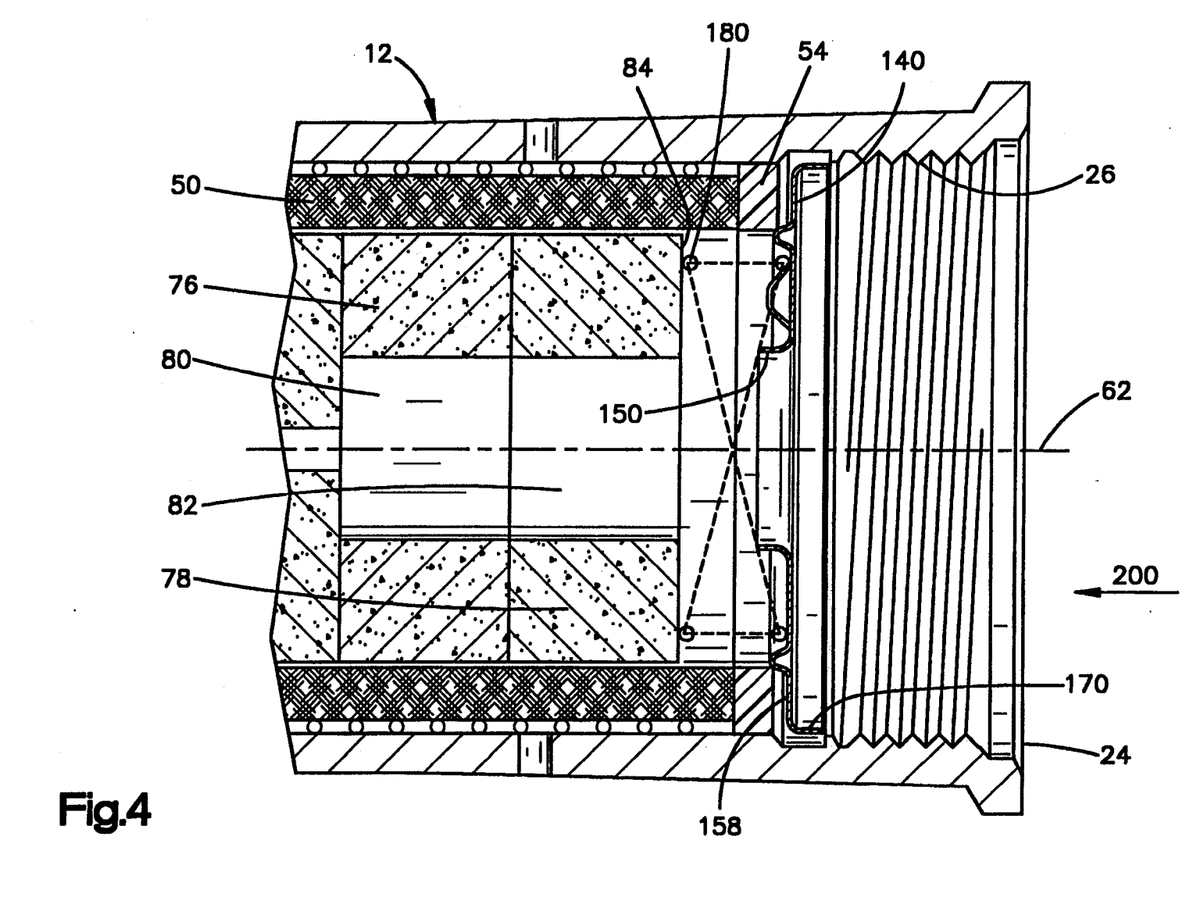
FIG. 4 is a view similar to FIG. 2 of parts of the inflator shown in a second step of assembly of the inflator.
Figure 5:
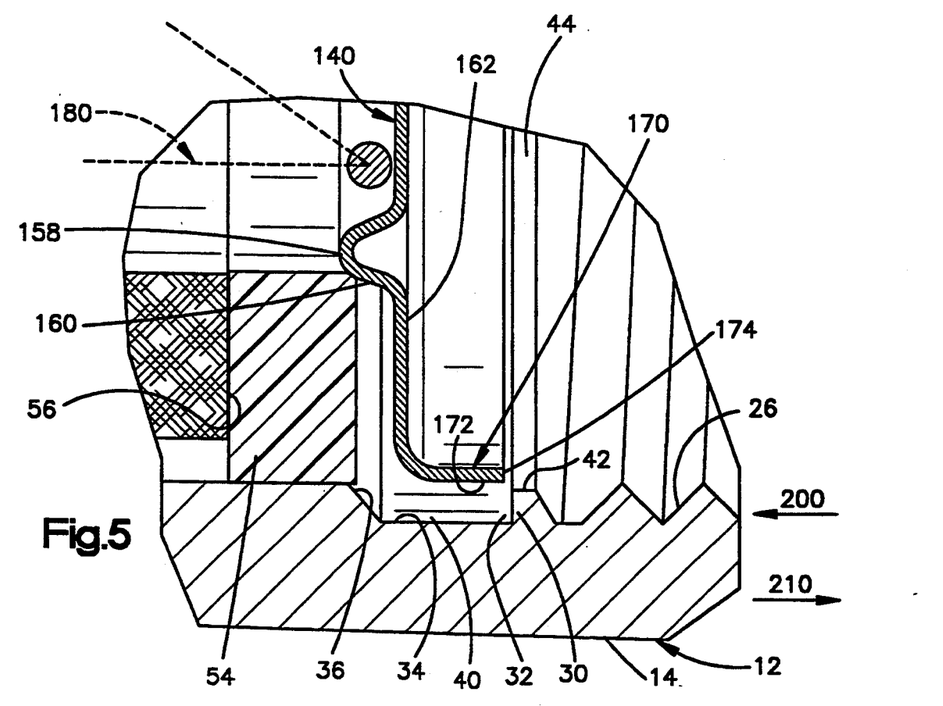
FIG. 5 is an enlarged view of a portion of FIG. 4.

The retainer assembly 138 is then moved farther axially into the chamber 18 in the housing 12, to a position as shown in FIGS. 4 and 5. The spring 180 is thus compressed partially. The retainer flange 170 is disposed adjacent to and radially inward from the groove 40 in the inflator housing. The retainer 140 is held in this position, using suitable tooling (not shown), against the axially outward biasing effect of the spring 180.

Figure 6:
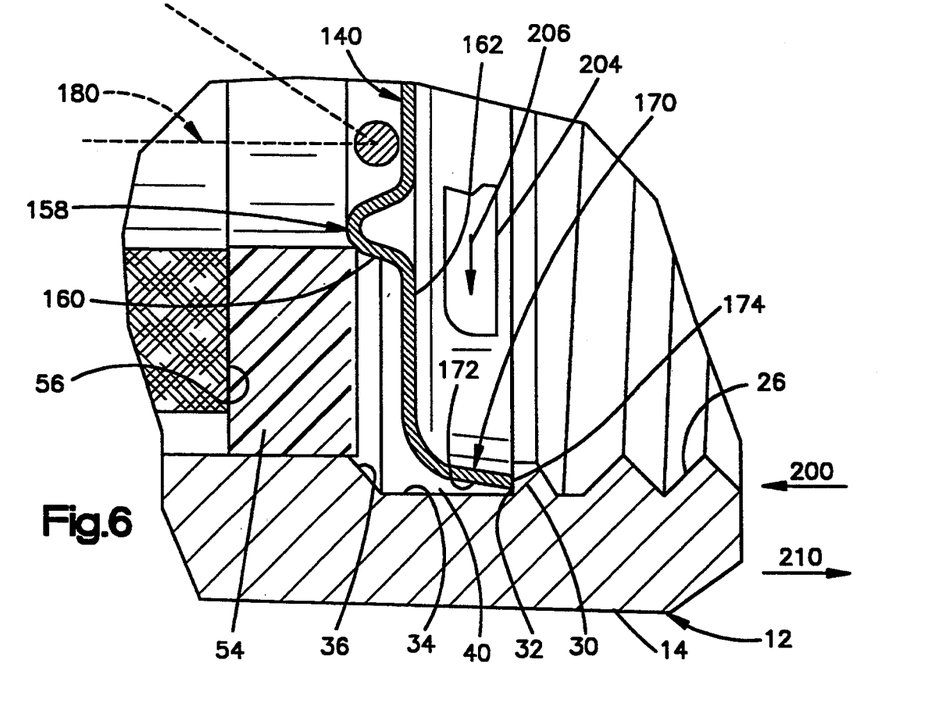
FIG. 6 is a view similar to FIG. 5 showing the retainer in a third step of assembly of the inflator.

The retainer flange 170 is then expanded radially outward into the groove 40 in the housing 12, using tooling of which a portion is indicated schematically at 204 in FIG. 6. The tooling may be a split ring having a circular outer periphery and an oval inner periphery. The split ring is disposed radially inside the retainer flange 170. An oval rod is inserted into the oval center of the split ring. As the rod is rotated, the portions of the split ring move radially outward, in a direction as indicated by the arrow 206, into contact with the retainer flange 170. Portions of the retainer flange 170 are expanded radially outward into the groove 40 in the housing 12 as shown in FIG. 6. The split ring tooling is then retracted radially inward. The inflator 10 including the retainer 140 is rotated through a portion of one revolution about the axis 62. The split ring tooling is again expanded radially outward to expand the remainder of the retainer flange 170 outward into the housing groove 40.

When the tooling initially expands the retainer flange 170 radially outward, the outer surface 172 of the flange 170 contacts the cylindrical inner surface 34 of the housing 12. When the tooling is retracted radially inward, the resiliency of the metal of which the retainer 140 is made causes the retainer flange 170 to spring back radially inward a small amount, as shown in FIG. 6, away from the cylindrical housing surface 34.

When the tooling is removed completely, the biasing effect of spring 180 urges the retainer 140 axially outward, in a direction as indicated by the arrow 210. The axial end surface 174 of the retainer flange 170 engages the radially extending surface 32 of the lip 30 of the housing wall 14. The outside diameter of the expanded retainer 140 is greater than the inside diameter of the passage 44 as defined by the lip 30. The retainer flange 170 is thus interlocked with the surface 32 of the lip 30 of the housing 12, blocking movement of the retainer assembly 138 toward the opening 24 of the chamber 18. This interlocking engagement inhibits movement of the parts of the inflator 10 disposed between the retainer 140 and the housing end wall 20, including the gas generating material 70 and the filter 50, toward the opening 24 of the chamber 18.

When the retainer assembly 138 is in this position, as shown in FIG. 6, the retainer 140 presses the outer filter seal 54 against the axial end 56 of the filter 50. The outer surface 160 of the retainer ridge 158 presses the outer filter seal 54 radially outward into sealing engagement with the inner surface 16 of the housing wall 14.

Figure 7:
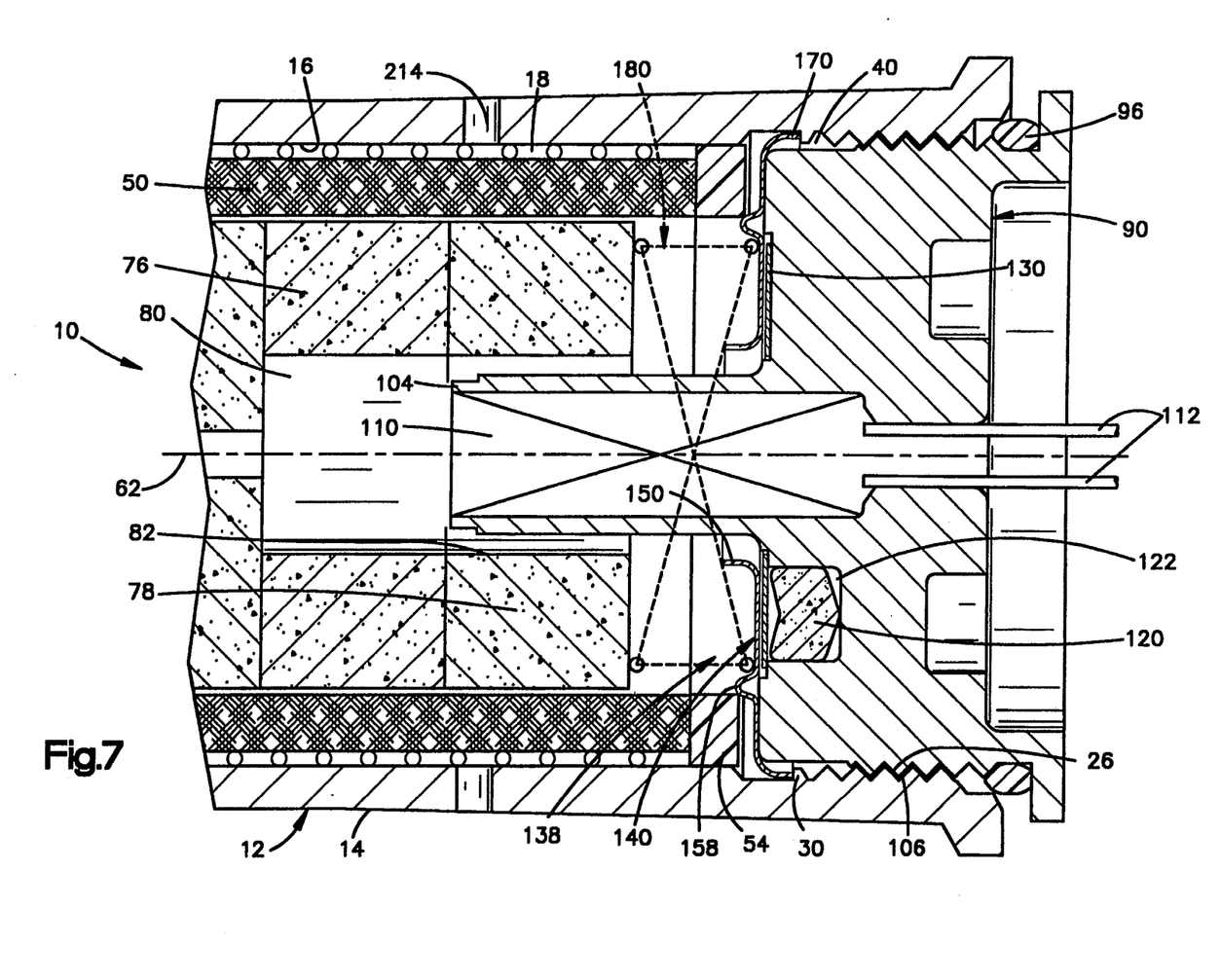
FIG. 7 is a view similar to FIG. 2 showing parts of the inflator in the third step of assembly of the inflator.

The end cap 90 is then connected with the housing 12 to close the opening 24 in the chamber 18. The end cap 90, which until this point in the assembly process is spaced apart from the housing 12 as shown in FIG. 3, is moved axially toward the housing in the direction indicated by the arrow 200. The outer thread 106 on the end cap 90 is threadedly engaged with the inner thread 26 on the housing wall 14. The end cap 90 is screwed into the housing 12, moving axially and rotationally relative to the housing, until the inner end surface 102 of the end cap 90 contacts the axially outward facing surface 144 of the retainer 140 as shown in FIG. 7. This engagement occurs when about one-half to one and one-half turns of rotation of the end cap 90 remain.

The parts of the inflator 10 are then in the condition shown in FIG. 7. With the inflator parts in this condition, a major portion of the end cap 90 is disposed within the chamber 18 in the housing 12. The barrel portion 104 of the end cap 90 extends through the central nozzle opening 154 in the retainer 140 and into the open center 82 of the axially outermost grain 78. The retainer flange 170 is still in the interlocking position shown in FIG. 6.

As the end cap 90 continues to rotate about the axis 62, it advances farther into the chamber 18 in the housing 12. The end cap 90 remains in engagement with the retainer 140 for the final approximately one-half turn to one and one-half turns of rotation of the end cap into position in the housing 12. During this last portion of the advancing movement of the end cap 90, the end cap 90 moves the retainer 140 axially inward in the direction indicated by the arrow 200, compressing the spring 180 and the outer filter seal 54 even further. As the retainer 140 is moved axially inward by the advancing end cap 90, the retainer flange 170 moves axially inward away from and out of engagement with the housing wall lip 30, and out of interlocking engagement with the housing 12. The end cap 90 holds the retainer flange 170 away from the housing wall lip 30. The parts of the inflator 10 then are in the fully assembled condition shown in FIG. 2.

Figure 2:
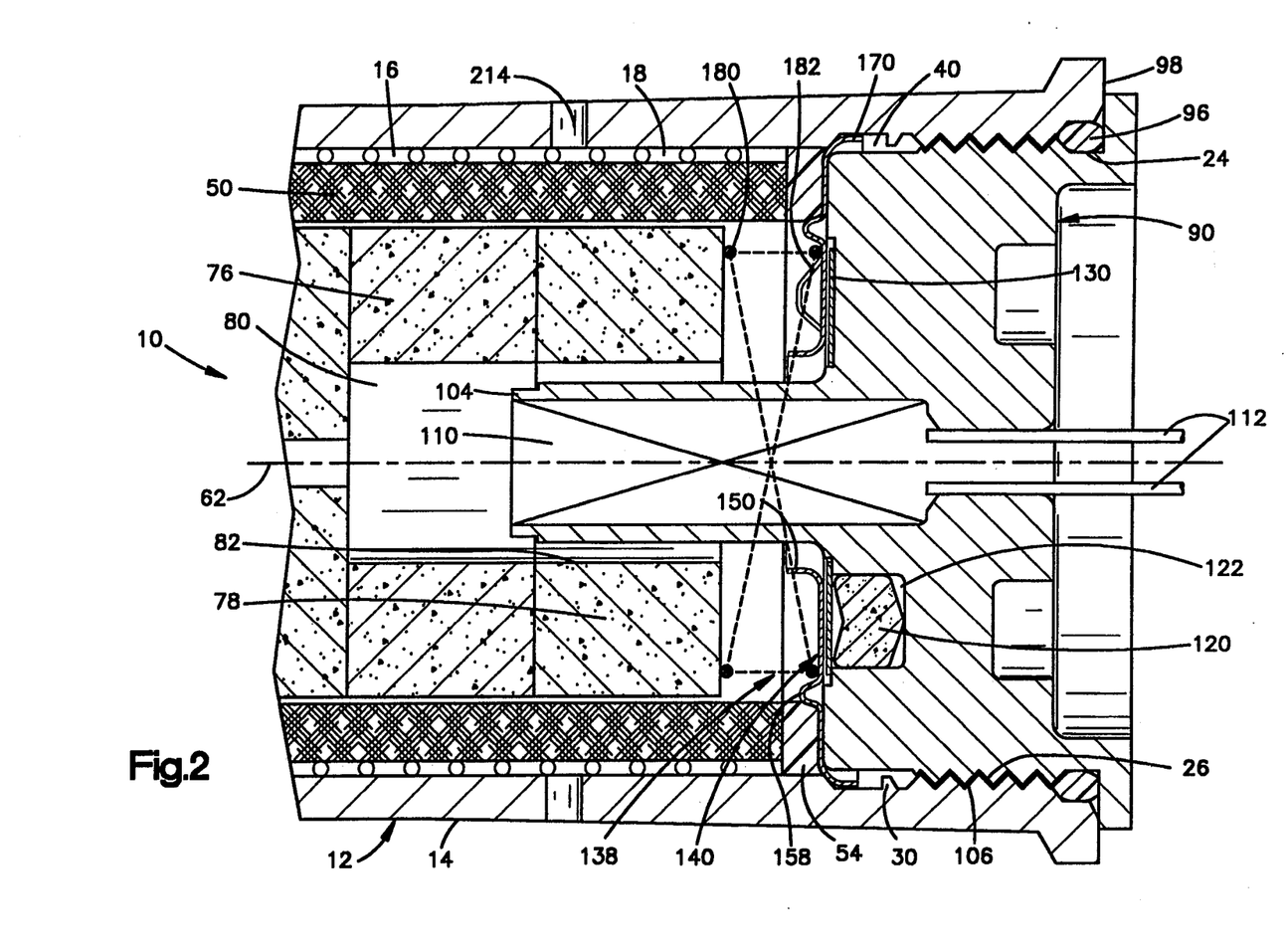
FIG. 2 is an enlarged view of a portion of the inflator of FIG. 1.

The retainer assembly 138 thus serves two functions during assembly of the inflator 10. First, the retainer assembly 138, being disposed intermediate the end cap 90 and the gas generating material 70, prevents the end cap from directly contacting the gas generating material. Therefore, it is not possible for the end cap 90 to contact directly and possibly damage the gas generating material 70. Second, the retainer assembly 138 minimizes axial loading of the threads 26 and 106 on the end cap 90 and housing 12, respectively, during assembly of the inflator 10. Specifically, the end cap 90 engages the retainer 140 only during the last portion of the advancing movement of the end cap into the housing 12. This can be seen through a comparison of: FIG. 3, showing the end cap 90 in a first position spaced apart from the housing 12; FIG. 7, showing the end cap in a second position as it first engages the interlocked retainer 140; and FIG. 2, showing the end cap in a third position fully inserted into the housing.

The major portion of the movement of the end cap 90 occurs prior to engagement of the end cap with the retainer 140 or with any inflator parts other than the housing 12. Because the retainer 140 is interlocked with the housing 12 during this portion of the assembly process, the retainer 140 inhibits movement of the inflator parts, including the gas generating material 70, axially outward relative to the housing. Thus, there are no inflator parts exerting an axially outward directed force on the end cap 90 during this portion of the end cap's movement. This minimizes axial loading of the threads on the end cap 90 and housing 12 during assembly of the inflator 10.

After the advancing end cap 90 engages the retainer 140, the biasing force of the retainer assembly spring 180 exerts an axially outward directed force on the end cap. However, when this occurs, there is already a substantial amount of threaded engagement between the end cap 90 and the housing 12. Thus, axial loading of the threads 26 and 106, which occurs during approximately the last one-half to one and one-half turns of the end cap 90, is not likely to result in thread galling or stripping.

The assembled inflator 10 is mounted in a vehicle (not shown) in conjunction with an inflatable occupant restraint, such as an air bag (not shown). Upon deceleration of the vehicle in an amount exceeding a predetermined amount, electrical circuitry in the vehicle sends an actuating signal over the lead wires 112 to actuate the igniter 110. The igniter 110 ignites the body 70 of gas generating material. The gas generating material rapidly produces a large quantity of gas for inflating the air bag. The gas flows radially outward through the filter 50 and through openings 214 in the housing wall 14, and thence into the air bag to inflate the air bag, in a known manner.

Should the ambient temperature around the inflator 10 exceed a predetermined temperature, the auto ignition material 120 ignites. Products of combustion of the auto ignition material 120 cause the foil tape 130 to lift off the radially extending surface 126 of the end cap 90 and move axially in the direction indicated by the arrow 200, to the position shown in dashed lines in FIG. 10. The foil tape 130 engages the surface 144 of the retainer 140.

Figure 10:
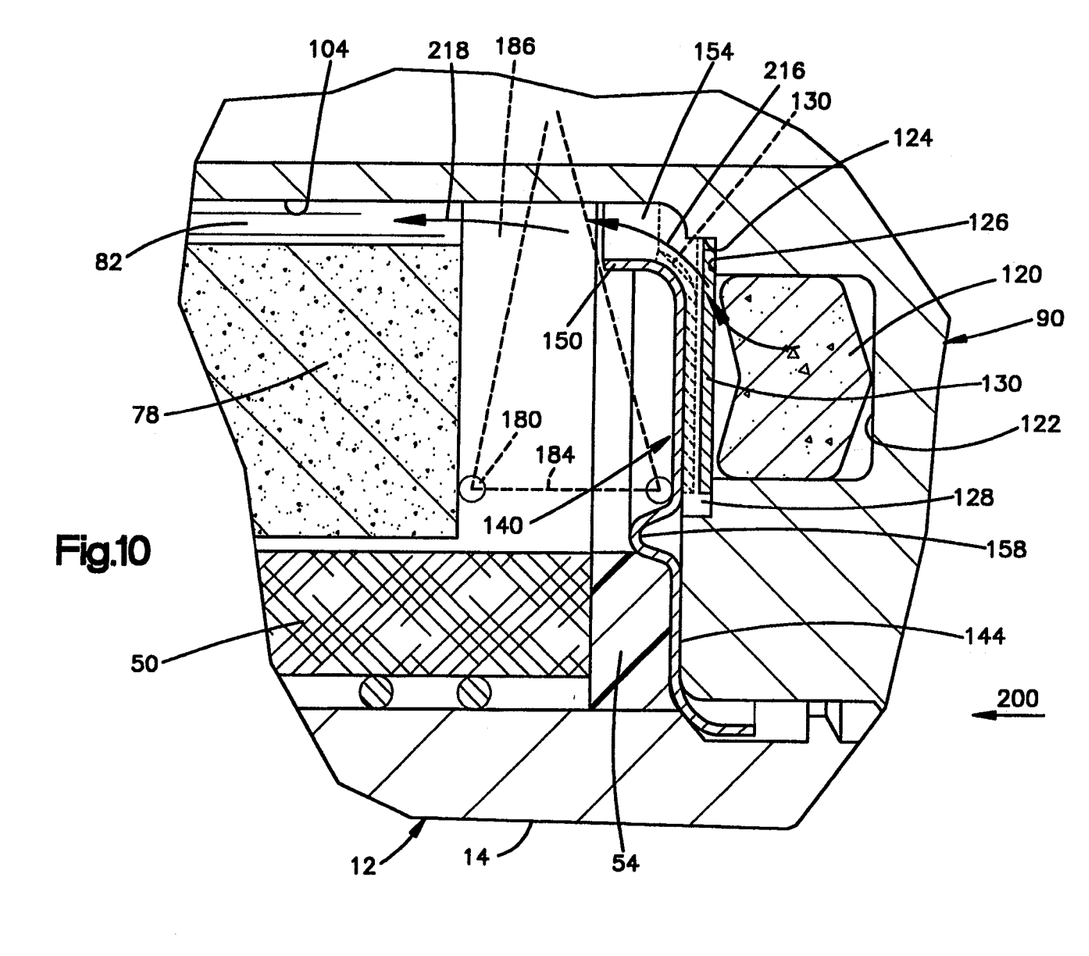
FIG. 10 is an enlarged view showing a portion of the inflator of FIG. 1 including auto ignition material of the inflator.

The products of combustion of the auto ignition material 120 flow through the annular recess 128 in the end cap 90, between the end cap and the foil tape 130. The products of combustion flow into and through the opening 154 in the retainer nozzle 150 as indicated by the arrow 216. The retainer nozzle 150 directs the products of combustion of the auto ignition material 120 into and through the open center passage 186 of the spring 180, radially outside of the end cap barrel portion 104. The products of combustion then flow into the open centers 80 and 82 of the grains 76 and 78 of gas generating material, as indicated by the arrow 218. The products of combustion of the auto ignition material 120 can thus ignite the gas generating material 70.

The retainer assembly 138 thus serves several functions after assembly of the inflator 10. First, the retainer assembly 138, including the ridge 158, urges the outer filter seal 54 radially outward into sealing engagement with the housing wall 14. Second, the retainer nozzle 150 provides a good flow path for the products of combustion of the auto ignition material 120, directing them in a desired manner toward and into contact with the body 70 of gas generating material.

From the above description of the invention, those skilled in the art will perceive improvements, changes and modifications in the invention. Such improvements, changes and modifications within the skill of the art are intended to be covered by the appended claims.

We claim:

1. Apparatus for inflating an inflatable vehicle occupant restraint comprising:
   a housing defining a chamber having an opening at one end;
   inflator parts disposed in said chamber including gas generating material for, when ignited, generating gas for inflating the occupant restraint;
   a closure member engageable with said housing for closing said opening of said chamber, said closure member being movable relative to said housing from a first condition in which said closure member is spaced apart from said housing and said chamber is open to a second condition in which said closure member is engaged with said housing and closes the opening of said chamber; and
   a retainer disposed in said chamber adjacent said opening, said retainer having a first part interlocking with a second part on said housing when said closure member is in the first condition to block movement of said retainer and of said inflator parts relative to said housing toward said opening of said chamber when said closure member is in the first condition.

2. An apparatus as set forth in claim 1 wherein said housing has a wall including a radially extending lip comprising said second part and defining a passage portion of said chamber spaced axially inward from said opening, said retainer being disposed axially inward of said lip.

3. An apparatus as set forth in claim 2 wherein said retainer has a first condition in which said retainer has an outer dimension smaller than said passage portion, said retainer being expandable from said first condition into a second condition having an outer dimension greater than said passage portion to interlock with said lip.

4. An apparatus as set forth in claim 1 wherein said retainer is disposed intermediate said closure member and said inflator parts and said retainer blocks engagement between said closure member and said inflator parts during movement of said closure member from the first condition to the second condition.

5. An apparatus as set forth in claim 1 wherein said closure men, bet has an inner end portion for engaging said retainer during movement of said closure member to the second condition.

6. An apparatus as set forth in claim 1 wherein said housing has a first thread adjacent said opening of said chamber, said closure member having a second thread engageable with said first thread, said closure member being rotatable and movable axially into said housing from said first condition in which said second thread of said closure member is spaced apart from said housing to said second condition in which said second thread of said closure member is engaged with said first thread of said housing and said closure member, said retainer blocking contact between said inflator parts and said closure member during the rotational and axial movement of said closure member into said chamber.

7. An apparatus as set forth in claim 1 further comprising a body of auto ignition material disposed in said housing, said auto ignition material having an ignition temperature below the ignition temperature of said gas generating material, said retainer being disposed intermediate said body of auto ignition material and said gas generating material, said retainer having nozzle means for establishing fluid communication between said auto ignition material and said gas generating material and for directing products of combustion of said auto ignition material toward said gas generating material to ignite said gas generating material upon ignition of said auto ignition material.

8. An apparatus as set forth in claim 1 further comprising biasing means fixed to an axially inner portion of said retainer and engaging the gas generating material.

9. Apparatus for inflating an inflatable vehicle occupant restraint comprising:
   a housing defining a chamber having an opening at one end;
   gas generating material disposed in said chamber in said housing for, when ignited, generating gas for inflating the occupant restraint;
   means for inhibiting movement of said gas generating material within said housing during assembly comprising a retainer disposed in said chamber adjacent said opening, said retainer having a first part interlocking with a second part on said housing to block movement of said retainer relative to said housing toward said open end during assembly; and
   a closure member closing said opening of said chamber when said retainer is in said chamber and having surface means for engaging said retainer and for holding said first part spaced away from said second part.

10. An apparatus as set forth in claim 9 wherein said housing comprises a wall defining said cheer and said second part on said housing comprises a housing wall surface extending transverse to an axis of said housing and at least partially defining a groove in said housing wall, said first part on said retainer comprising a portion of said retainer disposed in said groove and engaging said housing wall surface during assembly.

11. An apparatus as set forth in claim 10 wherein said retainer is, during assembly, expandable radially outward from a first condition in which said housing wall surface does not block movement of said retainer in said housing in the direction toward said opening of said chamber into a second condition in which said housing wall surface blocks movement of said retainer in said housing in the direction toward said opening of said chamber.

12. An apparatus as set forth in claim 10 wherein said housing wall is cylindrical and said housing wall surface extends around an inner periphery of said housing wall, said retainer being generally disc-shaped, said portion of said retainer disposed in said groove being an outer peripheral portion of said retainer.

13. An apparatus as set forth in claim 12 wherein said retainer comprises biasing means for biasing said gas generating material axially in said chamber, said biasing means projecting axially inward into said chamber from said retainer and engaging said gas generating material.

14. An apparatus as set forth in claim 9 comprising a filter disposed in said chamber in said housing for filtering gas generated by said gas generating material, said retainer during assembly blocking movement of said filter in said housing in a direction toward said opening of said chamber.

15. Apparatus for inflating an inflatable vehicle occupant restraint comprising:
a housing defining a cheer having an opening at one end;
a closure mender closing said opening;
gas generating material in said chamber in said housing for, when ignited, generating gas for inflating the occupant restraint;
a retainer disposed in said chamber in said housing intermediate said closure member and said gas generating material, said retainer having means for inhibiting movement of said gas generating material in said housing; and
a body of auto ignition material disposed in said housing, said auto ignition material having an ignition temperature below the ignition temperature of said gas generating material, said retainer being disposed intermediate said body of auto ignition material and said gas generating material;
said retainer having nozzle means for establishing fluid communication between said auto ignition material and said gas generating material and for directing products of combustion of said auto ignition material toward said gas generating material to ignite said gas generating material upon ignition of said auto ignition material.

16. An apparatus as set forth in claim 15 comprising surface means for defining a cavity in said closure member, said auto ignition material being located in said cavity in said closure member, said nozzle means comprising surfaces defining an opening in said retainer intermediate said cavity and said gas generating material.

17. An apparatus as set forth in claim 16 wherein said closure member includes an axially inner end face engaging an axially outer end face of said retainer, said closure member having surfaces defining an annular recess in said axially inner end face of said closure member for establishing fluid communication between said cavity and said opening in said retainer.

18. An apparatus as set forth in claim 15 wherein said nozzle means comprises surfaces defining an opening in said retainer intermediate said auto ignition material and said gas generating material, said apparatus including an igniter connected with said closure member and having a portion projecting axially through said opening in said retainer to a location axially inwardly of said retainer and adjacent said gas generating material, said opening in said retainer being larger than said projecting igniter portion and defining between said retainer and said igniter portion a flow passage for products of combustion of said auto ignition material.

19. A method of assembling an inflator for inflating an inflatable vehicle occupant restraint, said method including the steps of:
providing a housing defining a chamber having an opening at one end and having a locking surface disposed adjacent the opening;
inserting inflator parts including gas generating material into the chamber in the housing;
moving a retainer assembly axially inward into the chamber in the housing until the retainer assembly contacts the gas generating material and a portion of the retainer assembly is adjacent the locking surface of the housing;
expanding the portion of the retainer assembly outward into interlocking engagement with the locking surface of the housing; and then
connecting an end cap with the housing to close the opening in the chamber.

20. A method as set forth in claim 19 wherein the retainer assembly includes a spring and wherein said step of moving a retainer assembly includes the steps of contacting the gas generating material with the spring and then compressing the spring by moving the retainer assembly further axially into the chamber in the housing until the portion of the retainer is adjacent the locking surface of the housing.

21. A method as set forth in claim 20 wherein said step of connecting an end cap with the housing includes the steps of:
providing a closure member engageable with the housing for closing the opening of the chamber;
moving the closure member relative to the housing from a first condition in which the closure member is spaced apart from the housing and the cheer is open to a second condition in which the closure member is partially engaged with the housing, the closure member being spaced apart from the retainer during movement of the closure men, her from the first condition to the second condition; and
moving the closure member from the second condition to a third condition, the closure member when in the third condition being engaged with the housing and closing the opening of the chamber, the closure member having an inner end portion engaging the retainer during movement of the closure member from the second condition to the third condition.

22. A method as set forth in claim 21 wherein the housing has a first thread adjacent the opening and the closure member has a second thread engageable with the first thread, and wherein said step of connecting an end cap with the housing comprises moving the closure member rotationally and axially into the housing from the first condition in which the thread of the closure member is spaced apart from the housing to the third condition in which the thread of the closure member is engaged with the thread of the housing and the closure member closes the opening of the chamber.

23. A method as set forth in claim 22 including the step of preventing contact between the closure member and the inflator parts during movement of the closure member from the first condition to the second condition to minimize axial outward loading of the first and second threads during axial and rotational movement of the closure member from the first condition to the second condition.

* * * * *

UNITED STATES PATENT AND TRADEMARK OFFICE
CERTIFICATE OF CORRECTION

PATENT NO. : 5,380,039
DATED : January 10, 1995
INVENTOR(S) : Jerome W. Emery, Alex G. Meduvsky, Thomas L. Ruhlman and Thomas Osentoski It is certified that error appears in the above-indentified patent and that said Letters Patent is hereby corrected as shown below:

Column 8, line 11, change "men,bet" to --member--.

Column 9, line 33, change "mender" to --member--.

Column 10, line 46, change "cheer" to --chamber--.

Column 10, line 50, change "men,her" to --member--.

Signed and Sealed this

Fourth Day of July, 1995

Attest:

BRUCE LEHMAN

Attesting Officer     Commissioner of Patents and Trademarks